United States Patent
Vial

(10) Patent No.: US 8,635,161 B2
(45) Date of Patent: Jan. 21, 2014

(54) METHOD AND APPARATUS FOR INSERTING A REMOVABLE VISIBLE WATERMARK IN AN IMAGE AND METHOD AND APPARATUS FOR REMOVING SUCH WATERMARKS

(75) Inventor: Jean-François Vial, Rennes (FR)

(73) Assignee: Thomson Licensing, Issy les Moulineaux (FR)

(*) Notice: Subject to any disclaimer, the term of this patent is extended or adjusted under 35 U.S.C. 154(b) by 362 days.

(21) Appl. No.: 12/735,006

(22) PCT Filed: Dec. 10, 2008

(86) PCT No.: PCT/EP2008/067254
§ 371 (c)(1),
(2), (4) Date: Jun. 9, 2010

(87) PCT Pub. No.: WO2009/074618
PCT Pub. Date: Jun. 18, 2009

(65) Prior Publication Data
US 2010/0254569 A1    Oct. 7, 2010

(30) Foreign Application Priority Data
Dec. 13, 2007    (EP) .................................... 07301670

(51) Int. Cl.
*G06F 21/00* (2013.01)
(52) U.S. Cl.
USPC ................. 705/51; 705/57; 705/62; 283/113; 713/176
(58) Field of Classification Search
USPC .................. 705/51, 57, 62; 283/113; 713/176
See application file for complete search history.

(56) References Cited

U.S. PATENT DOCUMENTS

| 5,530,759 | A | * | 6/1996 | Braudaway et al. | 380/54 |
| 5,949,885 | A | * | 9/1999 | Leighton | 380/54 |
| 6,345,100 | B1 | * | 2/2002 | Levine | 380/205 |
| 6,574,350 | B1 | | 6/2003 | Rhoads et al. | |
| 6,775,392 | B1 | * | 8/2004 | Rhoads | 382/100 |
| 6,809,792 | B1 | * | 10/2004 | Tehranchi et al. | 352/85 |
| 6,901,514 | B1 | * | 5/2005 | Iu et al. | 713/176 |
| 2002/0199106 | A1 | * | 12/2002 | Hayashi | 713/176 |
| 2003/0070075 | A1 | | 4/2003 | Deguillaume et al. | |
| 2003/0099373 | A1 | * | 5/2003 | Joo et al. | 382/100 |

(Continued)

OTHER PUBLICATIONS

Riard Bosnjakovic, "Create a Traced Watermark Image", CreativeCOW.net, all pages, Nov. 3, 2007. http://web.archive.org/web/20071103054909/http://library.creativecow.net/articles/bosnjakovic_rikard/watermark.php.*

(Continued)

*Primary Examiner* — Calvin Cheung
(74) *Attorney, Agent, or Firm* — Tutunjian & Bitetto, P.C.

(57) ABSTRACT

A method of watermarking an image. A visible watermark is inserted in the image to obtain a visibly watermarked image. Information allowing removal of the visible watermark is protected to obtain protected information that is inserted as an invisible watermark in the visibly watermarked image to obtain a visibly and invisibly watermarked image. The information allowing removal of the visible watermark may be image values of the pixels to be covered by the visible watermark and, possibly, the position and size of the visible watermark, in which case these values are first memorized. The visible watermark may be opaque. Also provided are an apparatus for inserting the watermarks, a method for removing the visible watermark, essentially by performing the method "in a mirror", and an apparatus for removing the visible watermark.

5 Claims, 2 Drawing Sheets

(56) References Cited

U.S. PATENT DOCUMENTS

| | | | |
|---|---|---|---|
| 2003/0149879 A1* | 8/2003 | Tian et al. ............... | 713/176 |
| 2003/0179901 A1 | 9/2003 | Tian et al. | |
| 2003/0202679 A1 | 10/2003 | Rodriguez | |
| 2003/0223099 A1* | 12/2003 | Fan et al. ............... | 358/537 |
| 2004/0151311 A1* | 8/2004 | Hamberg et al. .......... | 380/44 |
| 2004/0170299 A1* | 9/2004 | Macy et al. ............. | 382/100 |
| 2005/0025337 A1* | 2/2005 | Lu et al. ................ | 382/100 |
| 2005/0140788 A1* | 6/2005 | Fox et al. ............... | 348/207.1 |
| 2005/0180596 A1* | 8/2005 | Abe et al. ............... | 382/100 |
| 2006/0133647 A1* | 6/2006 | Werner et al. ........... | 382/100 |
| 2010/0115282 A1* | 5/2010 | Amsterdam et al. ....... | 713/176 |

OTHER PUBLICATIONS

"How to add a watermark to your photos", All-Things-Photography.com, all pages, Oct. 6, 2007. http://web.archive.org/web/20071006210033/http://www.all-things-photography.com/add-a-watermark.html#How.*

Sue Chastain, "How to Add a Text Watermark Over a Photo in Photoshop 5.5 or higher", About.com, all pages, Aug. 22, 2006. http://web.archive.org/web/20060822130438/http://graphicssoft.about.com/cs/photoshop/ht/apswatermark.htm.*

Adobe Photoshop 6.0 User Guide, Adobe Systems Incorporated, 2000, all pages.*

* cited by examiner

METHOD AND APPARATUS FOR INSERTING A REMOVABLE VISIBLE WATERMARK IN AN IMAGE AND METHOD AND APPARATUS FOR REMOVING SUCH WATERMARKS

This application claims the benefit, under 35 U.S.C. §365 of International Application PCT/EP2008/067254, filed Dec. 10, 2008, which was published in accordance with PCT Article 21(2) on Jun. 18, 2009 in English and which claims the benefit of European patent application No. 07301670.1, filed Dec. 13, 2007.

FIELD OF THE INVENTION

The present invention relates generally to digital content processing, and in particular removable visible watermarking of images.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Visible watermarking of an image is a relatively simple technique that is divided into two main families: insertion of a little image in the original image, such as for example the logotype of a television channel in a corner, and semi-transparent superposition of a, generally binary, image of the same size as the original image.

Most techniques for visible watermarking may be expressed by the equation:

$$p^v_{i,j} = a_{i,j} \cdot p_{i,j} + b_{i,j}$$

where $p^v_{i,j}$ is the value of visibly watermarked pixel i, j, $p_{i,j}$ the value of the pixel before watermarking, and $a_{i,j}$ and $b_{i,j}$ are variables of the watermark.

For insertion of a little image in the original image having size M×N at coordinates I, J, the variables are:

for $I \le i < I+M$ and $J \le j < J+N$ (i.e. inside the visible watermark): $a_{i,j}$ is the transparency of the watermark ($0 \le a_{i,j} < 1$) and $b_{i,j}$ is the value of the watermark pixel x $(1-a_{i,j})$.

for $i < I$ or $i \ge I+M$ or $j < J$ or $j \ge J+N$ (i.e. outside the visible watermark): $a_{i,j}=1$ and $b_{i,j}=0$. In other words, the original image is not modified outside the watermark.

It follows that to remove the visible watermark, one may calculate $p_{i,j}$ from $p^v_{i,j}$ using $p_{i,j} = (p^v_{i,j} - b_{i,j})/a_{i,j}$, if $a_{i,j} \ne 0$.

For semi-transparent superposition of an image: $a_{i,j}$ is the value of the image pixel to superpose ($0 < a_{i,j} \le 1$) and $b_{i,j}=0$. To remove the watermark, one calculates $p_{i,j} = p^v_{i,j}/a_{i,j}$. A person skilled in the art will appreciate that in order to remove the visible watermark, one needs, in the first case, either $a_{i,j}$ and $b_{i,j}$ or $p_{i,j}$ if $a_{i,j}=0$. If $p_{i,j}$ represents an information mass smaller than $a_{i,j}$, then this may naturally be used directly, but it should be noted that $a_{i,j}$ usually is constant for a particular image. In the second case, one needs either $a_{i,j}$ or $p_{i,j}$.

A problem is that while it often is desirable to use visible watermarks in pictures, for example for copyright information, it may also be desirable to remove the visible watermark from the image. This may for example be the case in a system where a customer may freely download visibly watermarked images from a server and then buy the rights to use the image in its non-watermarked version.

It may thus be seen that a problem lies in the way an end-user may obtain the information necessary for removal of the visible watermark.

One trivial solution to the problem is to download the non-watermarked version of the image.

Another solution is presented in "Copyright Protection and Authentication of Grayscale Images by Removable Visible Watermarking and Invisible Signal Embedding Techniques: A New Approach" by Pei-Ming Huang and Wen-Hsiang Tsai; 16th IPPR Conference on Computer Vision, Graphics and Image Processing (CVGIP 2003), August 2003. A binary logo is inserted as a visible watermark (semi transparent) and as an invisible watermark at the same position in the picture. In practice, the values of the pixels to be marked are multiplied by a factor k (0<k<1), for the visible watermark, and their least significant bit (LSB) is set to 1 while it is set to 0 for other pixels, for the invisible watermark. To remove the visible watermark, pixel values which have their LSB set to 1 are simply divided by k. A problem with this solution is that anyone can easily remove both the visible and invisible watermarks.

Published patent application US 2001/0004736 solves the problem by copying the part of the image into which the visible watermark is to be put. The watermark is then embedded as an invisible watermark in the copied information, and this is then encrypted. The encryption key and the position and size of the visible watermark are then encrypted using a second encryption key to create authentication information that is embedded as an invisible watermark in the original image (except for in the watermarked part). Finally, the twice watermarked original image and the encrypted watermarked copied information are then sent to the user. While this solution solves the problem, it is quite burdensome.

It can therefore be appreciated that there is a need for a solution that allows controlled removal visible watermarks that is simpler than the solutions of the prior art. This invention provides such a solution.

SUMMARY OF THE INVENTION

In a first aspect, the invention is directed to a method of watermarking an image. Values of pixels of the image to be covered by an opaque watermark are memorised, the opaque watermark is inserted in the image to obtain a visibly watermarked image, the memorised pixel values are protected to obtain protected information, and the protected information is inserted as an invisible watermark in the visibly watermarked image to obtain a visibly and invisibly watermarked image.

In a first preferred embodiment, the memorised pixel values further comprises the position and size of the visible watermark in the visibly watermarked picture.

In a second preferred embodiment, the protecting step comprises encrypting the memorised pixel values.

In a second aspect, the invention is directed to a method of removing a visible watermark from an image that further comprises an invisible watermark. The invisible watermark comprising protected values of pixels that are to replace the visible watermark is extracted and the protected information is unprotected to obtain values of pixels that are to replace the visible watermark. The visible watermark is then removed by restoring the pixels for which the values were comprised in the invisible watermark.

In a third aspect, the invention is directed to an apparatus for watermarking an image. The apparatus comprises means for memorising values of pixels of the image to be covered by an opaque watermark, means for inserting the opaque watermark in the image to obtain a visibly watermarked image, means for protecting the memorised pixel values to obtain protected information, and means for inserting the protected information as an invisible watermark in the visibly watermarked image to obtain a visibly and invisibly watermarked image.

In a first preferred embodiment, the means for inserting the protected information is further adapted to also insert the position and size of the visible watermark in the visibly watermarked picture.

In a second preferred embodiment, the protecting means is an encryption module.

In a fourth aspect, the invention is directed to an apparatus for removing a visible watermark from an image that further comprises an invisible watermark. The apparatus comprises means for extracting the invisible watermark comprising protected values of pixels that are to replace the visible watermark, means for unprotecting the protected information to obtain values of pixels that are to replace the visible watermark, and means for removing the visible watermark by restoring the pixels for which the values were comprised in the invisible watermark.

BRIEF DESCRIPTION OF THE DRAWINGS

Preferred features of the present invention will now be described, by way of non-limiting example, with reference to the accompanying drawings, in which.

PREFERRED EMBODIMENT OF THE INVENTION

Figure 1:
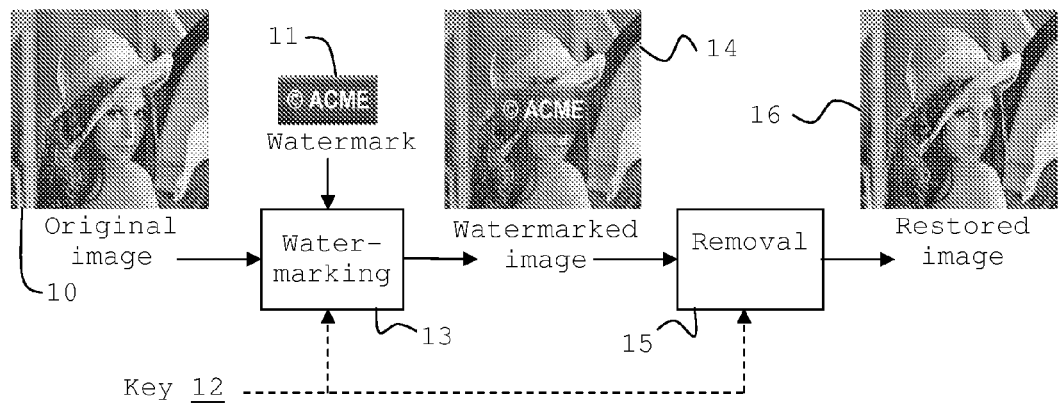
FIG. 1 illustrates the general concept of the invention.

FIG. 1 illustrates the general concept of the invention. An original image 10 is watermarked 13 using a visible watermark 11 and a, preferably secret, key 12, which gives a watermarked image 14. This watermarked image 14 may then be restored by removal 15 of the watermark 11 using the key 12, so as to obtain a restored image 16. The person skilled in the art will appreciate that it is not always possible to obtain a restored image 16 that is identical to the original image 10, as small differences may appear during the insertion and removal of the visible watermark.

The general inventive concept of the invention is to insert the, preferably encrypted or otherwise protected, information necessary for removal of the visible watermark as an invisible watermark in the image itself.

Figure 2:
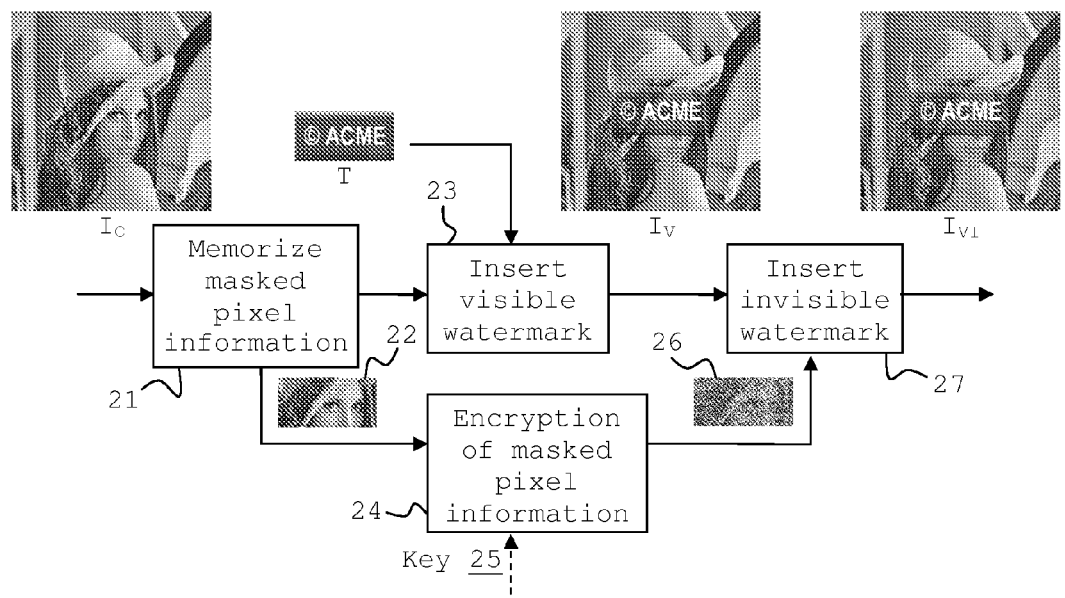
FIG. 2 illustrates insertion of watermarks according to a first preferred embodiment of the invention.

FIG. 2 illustrates insertion of watermarks according to a first preferred embodiment of the invention, wherein a small image T is inserted as a visible watermark. In this example, the image T is opaque, i.e. $a_{i,j}=0$. When a visible watermark T is to be inserted in an original image $I_O$, then the values of the pixels that will be masked by the watermark T are memorised 21, which gives an extracted image 22. The watermark T may then be inserted 23 in the original image $I_O$, thus giving a visibly watermarked image $I_V$.

The skilled person will appreciate that in some cases when the image T is not opaque ($a_{i,j} \neq 0$), it is equally possible, as an alternative, to memorise the values of the variables $a_{i,j}$ and $b_{i,j}$ instead of the values $p_{i,j}$ of the pixels.

The masked pixel information 22, whether it be the values of the pixels $p_{i,j}$ or the values of the variables $a_{i,j}$ and $b_{i,j}$, is then preferably encrypted 24 using a key 25 so as to obtain protected masked pixel information 26 that may also comprise information about the position and form or size of the visible watermark. The encryption algorithm may be symmetrical or asymmetrical.

The protected masked pixel information 26 is then inserted 27 as an invisible watermark into the visibly watermarked picture $I_V$ thus obtaining a visibly and invisibly watermarked image $I_{VI}$.

Any suitable technique for inserting an invisible watermark may be employed, as long as they provide an insertion capacity sufficient for inserting the protected masked pixel information 26 in the visibly watermarked picture $I_V$ with little visual degradation thereto. It should be noted that the insertion of a 64×64 pixel logo in a black and white image using 8 bits to represent each pixel requires an invisible watermark of 32768 bits, something that may easily triple, for a colour image, depending on format. On the other hand, there is no need for a robust invisible watermark, as a hacker has no interest whatsoever in removing the invisible watermark, since the invisible watermark contains the information necessary for the removal of the visible watermark. It should also be noted that if some lossy compression is to be applied to the watermarked image, the invisible watermark must be designed in order to resist to this lossy compression.

Figure 3:
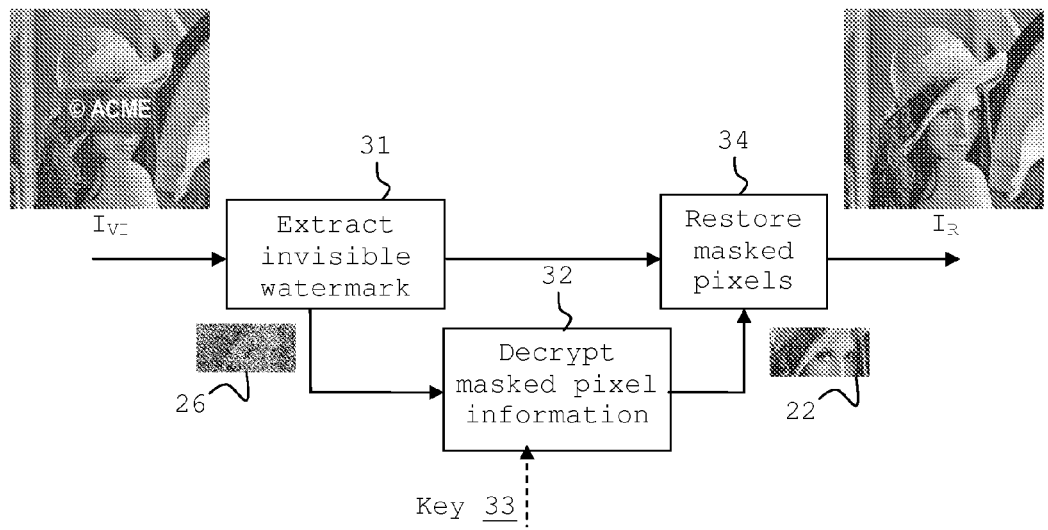
FIG. 3 illustrates removal of watermarks according to the first preferred embodiment of the invention.

FIG. 3 illustrates removal of watermarks according to the first preferred embodiment of the invention, wherein a small visible watermark T is removed. A visibly and invisibly watermarked image $I_{VI}$ is received and the invisible watermark 26 is removed 31 from it. Using a key 33, that depending on the encryption algorithm may be identical to the key 25 used for encryption, the masked pixel information 26 is decrypted 32, and masked pixel information 22 is obtained. The masked pixel information 22 may then be used to restore 34 the masked pixels, after which a restored image is obtained $I_R$. The restored image $I_R$ is then identical to the original image $I_O$ except for the losses caused by the invisible watermark. In case the masked pixel information 22 comprises values of $a_{i,j}$ and $b_{i,j}$, then further losses may appear owing to rounding up or down of calculation results.

Exemplary algorithms for carrying out the methods of the first preferred embodiment will now be described in greater detail. $I_O$ is the original image of size M'×N', composed of pixels $p_{i,j}$ (0≤i<M', 0≤j<N'). The bit at position b (0≤b<8, b=0 for the least significant bit) is denoted $p_{i,j}[B]$. The image T to be visibly watermarked in position I, J in $I_O$, is of size M×N and composed of pixels $b_{i,j}$. The size of $I_O$ is at least seven times that of T (7×M×N≤M'×N').

First the pixels in $I_O$ that will be replaced by those of T are stored in a temporary memory TEMP. Only the seven most significant bits need to be stored, as the least significant bit of all other pixels of the image will be used for the values of the invisible watermark:

```
c ← 0
for i = 0 to M−1
    for j = 0 to N−1
        for k = 1 to 7
            TEMP[c] ← p_{I+i,J+j}[k]
            c ← c + 1
        repeat
    repeat
repeat
```

The contents of TEMP is then encrypted, for example using the AES algorithm:

encrypt TEMP with key $K$

The visible watermark may then be inserted, by replacing the pixels of $I_O$ by those of T:

```
for i = 0 to M−1
    for j = 0 to N−1
        p_{I+i,J+j} ← b_{i,j}
    repeat
repeat
```

The pixels $p_{i,j}$ now form image $I_V$. The invisible watermark may then be inserted in the least significant bits of the pixels of $I_V$:

```
for c = 0 to 7 × M × N − 1
    i ← c / N'        /* Euclidian division */
    j ← c modulo N'
    p_{i,j}[0] ← TEMP[c]
repeat
```

If the image $I_O$ is fourteen times bigger (or more) than the watermark image T, then it is possible to repeat the invisible watermark at least once.

The pixels $p_{i,j}$ now form image $I_{VI}$ and the method for inserting the watermarks is finished.

It should be noted that the invisible watermarking method is not part of the core of the invention, and that the one described in the present example has been chosen for its simplicity and would not resist to any lossy compression that may be applied to the watermarked image.

To remove the visible watermark, the algorithm is performed in the reverse direction:

```
for c = 0 to 7 × M × N − 1
    i ← c/N'          /* Euclidian division */
    j ← c modulo N'
    TEMP[c] ← p_{i,j}[0]
repeat
decrypt TEMP with key K (or a corresponding key)
c ← 0
for i = 0 to M−1
    for j = 0 to N−1
        for k = 1 to 7
            p_{I+i,J+j}[k] ← TEMP[c]
            c ← c + 1
        repeat
    repeat
repeat
```

The pixels $p_{i,j}$ now form image $I_R$, identical with $I_O$ apart from, in all probability, in some of the least significant bits.

The algorithms for inserting and removing a visible watermark in the alternative where the masked pixel information comprises $a_{i,j}$ and $b_{i,j}$ instead of $p_{i,j}$ will not be described, as it is believed that it is well within the competence of the skilled person to perform the necessary modifications.

Figure 4:
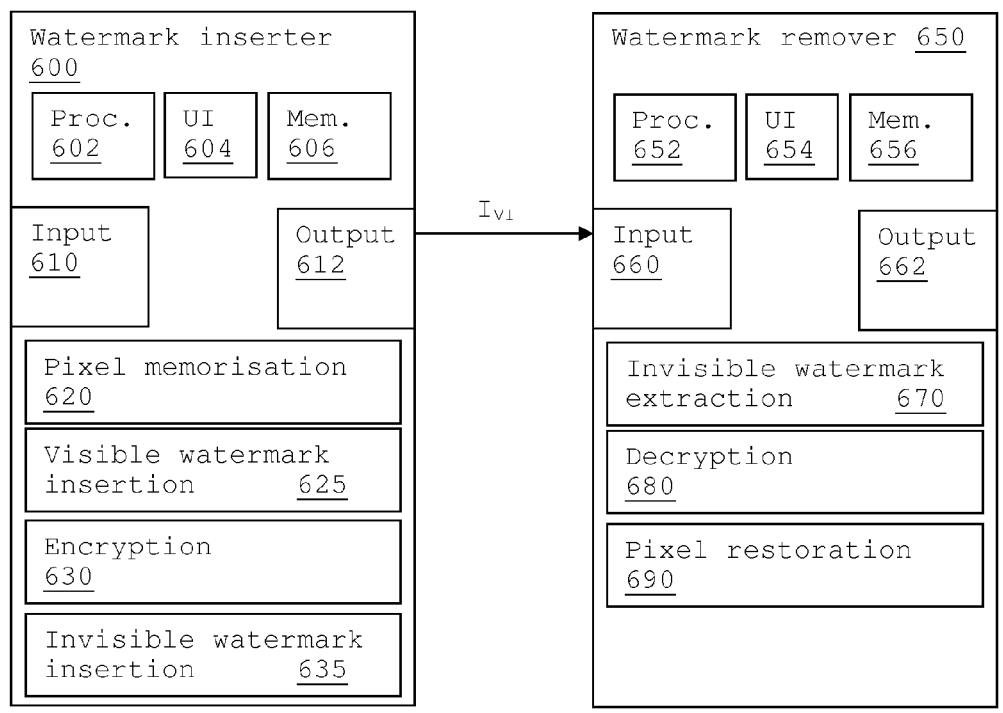
FIG. 4 illustrates devices adapted to perform the methods of the first preferred embodiment.

In the description of FIG. 4, certain elements are described as functional modules. It will be appreciated that these functional modules do not necessarily correspond to physical entities; they could for example be implemented in software, one or more hardware components, or a combination of the two.

FIG. 4 illustrates devices adapted to perform the methods of the first preferred embodiment. A watermark inserter 600 comprises one or more processors (hereinafter "processor") 602, a user interface 604 and at least one memory (hereinafter "memory") 606. The watermark inserter 600 further comprises an input 610 and an output 612. The input 610 is adapted to receive an original image and a watermark image, either from an external source or from the internal memory 606, and the output 612 is adapted to send a visibly and invisibly watermarked image $I_{VI}$ to another device, such as a watermark remover 650.

The watermark inserter 600 further comprises a pixel memorisation module 620, a visible watermark insertion module 625, an encryption module 630, and an invisible watermark insertion module 635.

It will thus be appreciated that the watermark inserter 600 comprises the necessary functional and structural entities needed for creating a visibly and invisibly watermarked image according to the first preferred embodiment of the invention.

The watermark remover 650 comprises a processor 652, a user interface 654 and a memory 656. The watermark remover 650 further comprises an input 660 and an output 662. The input 660 is adapted to receive, directly or indirectly, a visibly and invisibly watermarked image $I_{VI}$ from the watermark inserter 600, and the output 662 is adapted to render the restored image or to send it to another device.

The watermark remover 650 further comprises an invisible watermark extraction module 670, a decryption module 680, and a pixel restoration module 690.

It will thus be appreciated that the watermark remover 650 comprises the necessary functional and structural entities needed for restoring a visibly watermarked image according to the first preferred embodiment of the invention.

It will be appreciated that, while the present invention has been described using still images as an example, it may also be employed for digital video, as this is a series of still images.

It will be further appreciated that while the invention has been described using black and white images, it may be easily adapted to colour images, for example by applying the described techniques to each component CrCb, RVB or CMJN, as the case may be.

It will also be appreciated that the present invention provides ways of inserting and removing visible watermarks into images, wherein the visible watermark may be removed using information in an invisible watermark in the image. It is possible to remove the watermarks using only information comprised in the image, except for, in preferred embodiments, a decryption key.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A method of watermarking an image comprising the steps of:
    memorizing, in a watermark inserter, original values of pixels of the image to be covered by an opaque removable watermark;
    inserting the opaque removable watermark in the image to obtain a visibly watermarked image;

protecting the memorized original pixel values to obtain protected information; and inserting the protected information as an invisible watermark in the visibly watermarked image to obtain a visibly and invisibly watermarked image, wherein the protected information is used for removing said opaque removable watermark.

2. The method of claim 1, wherein the memorised original pixel values further comprises the position and size of the visible watermark in the visibly watermarked image.

3. The method of claim 1, wherein the protecting step comprises encrypting the memorised original pixel values.

4. An apparatus for watermarking an image comprising:

a processor configured to execute each of the following modules;

a pixel memorization module configured to memorise values of pixels of the image to be covered by an opaque watermark;

a visible watermark insertion module configured to insert an opaque watermark in the image to obtain a visibly watermarked image;

an encryption module configured to protect the memorised pixel values to obtain protected information; and an invisible watermark insertion module configured to insert the protected information as an invisible watermark in the visibly watermarked image to obtain a visibly and invisibly watermarked image, wherein the protected information is used for removing said opaque removable watermark.

5. The apparatus of claim 4, wherein the invisible watermark insertion module is further configured to also insert the position and size of the visible watermark in the visibly watermarked picture.

\* \* \* \* \*